US010063972B1

(12) United States Patent
Zanpure (10) Patent No.: US 10,063,972 B1
(45) Date of Patent: Aug. 28, 2018

(54) METHOD AND PERSONALIZED AUDIO SPACE GENERATION SYSTEM FOR GENERATING PERSONALIZED AUDIO SPACE IN A VEHICLE (71) Applicant: Wipro Limited, Bangalore (IN)

(72) Inventor: Chaitanya Rajendra Zanpure, Pune (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/900,217

(22) Filed: Feb. 20, 2018

(30) Foreign Application Priority Data

Dec. 30, 2017 (IN) .............................. 201741047426

(51) Int. Cl.
*H04R 3/12* (2006.01)
*H04R 1/40* (2006.01)
*G10K 11/178* (2006.01)
*G06K 9/00* (2006.01)

(52) U.S. Cl.
CPC ........... *H04R 3/12* (2013.01); *G06K 9/00838* (2013.01); *G10K 11/17823* (2018.01); *H04R 1/403* (2013.01); *G10K 2210/1282* (2013.01); *G10K 2210/3044* (2013.01); *H04R 2499/13* (2013.01)

(58) Field of Classification Search
None
See application file for complete search history.

(56) References Cited

U.S. PATENT DOCUMENTS

| 6,650,758 B1 * | 11/2003 | Van Schyndel .......... H04R 1/02 381/335 |
| 2006/0239471 A1 | 10/2006 | Mao et al. |
| 2008/0273723 A1 * | 11/2008 | Hartung ................. H04R 1/403 381/302 |
| 2011/0286614 A1 * | 11/2011 | Hess ....................... H04S 7/303 381/302 |
| 2012/0057716 A1 * | 3/2012 | Chang .................. G10K 11/178 381/71.1 |

FOREIGN PATENT DOCUMENTS

| CN | 103202038 A | 7/2013 |
| WO | 2016054679 A1 | 4/2016 |

* cited by examiner

*Primary Examiner* — Paul Huber
(74) *Attorney, Agent, or Firm* — LeClairRyan PLLC (57) ABSTRACT The present disclosure relates to a method and system for generating personalized audio space in vehicle. Information related to user in each region of the vehicle is collected and analyzed to determine direction of first directional speakers associated with corresponding region. An audio space boundary for each region is identified based on the direction of first directional speakers in the corresponding region. Further, the proposed method renders first sound wave of a user selected audio using first directional speakers in the region and transmits a second sound wave corresponding to first sound wave in the region using second directional speakers associated with the corresponding region. The second sound wave restricts rendering of the first sound wave beyond the audio space boundary of the one of the one or more regions to generate the personalized audio space in the vehicle.

20 Claims, 5 Drawing Sheets

METHOD AND PERSONALIZED AUDIO SPACE GENERATION SYSTEM FOR GENERATING PERSONALIZED AUDIO SPACE IN A VEHICLE

This application claims the benefit of Indian Patent Application Serial No. 201741047426, filed Dec. 30, 2017, which is hereby incorporated by reference in its entirety.

FIELD

The present subject matter is related, in general to audio processing systems and more particularly, but not exclusively to a method and system for generating personalized audio space in a vehicle.

BACKGROUND

Current infotainment system in vehicles is such that users or passengers in the vehicle will have to listen to a same music or audio that is put on by one of the users. Most of the times, the music or audio that is played by interest of one user may not be of interest to another user and the user might get bored. Also, in one case, one of the users, for example, a driver may tend to hear navigation guidelines provided by the vehicle via the infotainment system and other users or passengers in the vehicle may not be interested in listening to the same. Therefore, users or passengers of the vehicle tend to put on two or more devices or sources like music-player and speakers in the vehicle. This results in overlapping of audio played via multiple devices and hence audio played by multiple users through multiple devices or sources cannot be heard properly. Therefore, it is necessary to segregate regions in the vehicle and play music or audio for the user in that particular region according to his/her music preferences, such that the sound playing in one region is not audible to the users sitting in other regions.

Some existing methods to overcome the above problem include a technique of directing sound waves in a particular direction by creating a directional sound field. These techniques are limited to an auditorium or sports stadium. Some of the other techniques use high and low frequency sounds to do customized spatial distribution of sound and a method for controlling the spatial distribution. Other methods include use of array of directional speakers to reduce interference of sound and enhance the listening experience. These techniques may not efficiently deliver sound to desired user as they fail to segregate sound in a closed space of the vehicle, for example a car, for personalized music or media content delivery in particular space.

The above said techniques may fail to create an audio space boundary for audio content delivery. The identification of the audio space boundary is a technical challenge as audio that the user intends to listen propagates within the enclosed space of the vehicle. Further, determining the boundary is difficult as a position, height and related parameters of each user might be different. Also, the position of the speakers used to emit the audio also varies. Thus, due to variation in the parameters, determination of the audio space boundary for audio content delivery becomes a technical challenge. Segregating sound in enclosed spaces has also been a challenge due to overlapping of sound patterns from one region to the other. Due to climate control for each position/region in the car, specific acoustic impedance for each region may be different and, thus sound from one region may enter the other region even with use of directional speakers.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Embodiments of the present disclosure relates to a method of generating a personalized audio space in a vehicle. The method comprises receiving user related information of a user in the vehicle from at least one image sensor associated with each of one or more regions in the vehicle. The method further comprises determining direction of one or more first directional speakers associated with each of the one or more regions in the vehicle based on the received user related information. The method includes identifying an audio space boundary for each of the one or more regions based on the direction of the one or more first directional speakers of corresponding region of the one or more regions. The method also includes rendering a first sound wave of a user selected audio using the one or more first directional speakers associated with one of the one or more regions where the user is seated. Upon rendering the first sound wave, a second sound wave corresponding to the first sound wave is generated and transmitted along the identified audio space boundary of the one of the one or more regions using one or more second directional speakers associated with the one of the one or more regions. The first sound wave and the second sound wave converge at the audio space boundary of the region such that the second sound wave restricts rendering of the first sound wave beyond the audio space boundary of the one of the one or more regions to generate the personalized audio space in the vehicle.

Further, the present disclosure relates to a personalized audio space generation system. The system comprises a processor and a memory communicatively coupled with the processor. The memory stores processor-executable instructions, which on execution, cause the processor to receive a user related information of a user in the vehicle from at least one image sensor associated with each of one or more regions in the vehicle. Further, the processor is configured to determine direction of one or more first directional speakers associated with each of the one or more regions in the vehicle based on the received user related information. The processor is further configured to identify an audio space boundary for each of the one or more regions based on the direction of the one or more first directional speakers of corresponding region of the one or more regions. The processor is also configured to render a first sound wave of a user selected audio using the one or more first directional speakers associated with one of the one or more regions where the user is seated. Based on the first sound wave, a second sound wave corresponding to the first sound wave is generated and transmitted along the identified audio space boundary of the one of the one or more regions using one or more second directional speakers associated with the one of the one or more regions. The first sound wave and the second sound wave converge at the audio space boundary of the region such that the second sound wave restricts rendering of the first sound wave beyond the audio space boundary of the one of the one or more regions to generate the personalized audio space in the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and system for generating a personalized audio space in a vehicle. More particularly, the proposed method and system segregates regions in the vehicle and plays music for the user seated in that particular region according to his/her music preferences. The proposed method determines information related to user position in the vehicle using a video feed captured by image sensors associated with each of one or more regions in the vehicle. The material of interior of the vehicle and acoustic characteristics associated with the material of interior of the vehicle are also determined based on the captured video feed. Based on the user related information, the direction of one or more first directional speakers associated with each of the one or more regions may be determined in such a manner that the sound of the first directional speakers is only directed to the user in that position. The audio space boundary for each of the one or more regions in the vehicle may be identified based on the direction of the one or more first directional speakers of corresponding region of the one or more regions. For example, if the direction of first directional speakers propagates in an elliptical area then audio space boundary is identified just along the boundary of the elliptical propagated area. Further, the proposed method may determine audio track that the user intends to play via corresponding input source and determine a first sound wave associated with the audio that a user intends to play in the vehicle. The determined first sound wave is played using the one or more first directional speakers placed in the associated region of the vehicle. Subsequently, a second sound wave with amplitude and frequency same as that of the first sound wave and at phase shift of 180 degrees with respect to first sound wave is generated. Upon generating the second sound wave, one or more second directional speakers associated with the one of the one or more regions may transmit the second sound wave along the identified audio space boundary. The first sound wave and the second sound wave converge at the audio space boundary of the one of the one or more regions in such a way that the second sound wave restricts rendering of the first sound wave beyond the audio space boundary of the corresponding region. Thus, the present invention generates a personalized audio space in the vehicle by eliminating the complexity of sound overlapping.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
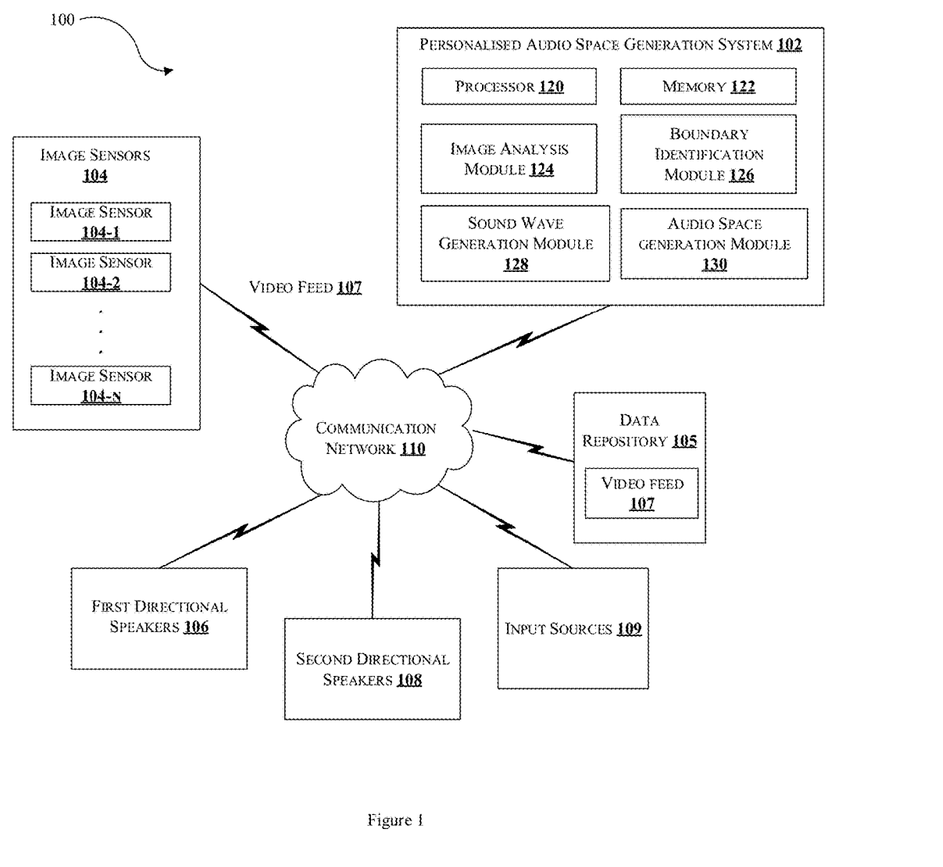
FIG. 1 illustrates an exemplary architecture of a system for generating a personalized audio space in a vehicle, in accordance with some embodiments of the present disclosure.

FIG. 1 illustrates an exemplary architecture of a system for generating a personalized audio space in a vehicle in accordance with some embodiments of the present disclosure.

As illustrated in FIG. 1, the exemplary system comprises one or more components configured for generating personalized audio space in a vehicle. The exemplary system 100 comprises a personalized audio space generation system 102 (hereinafter referred to as PAGS), one or more image sensors 104-1, 104-2 . . . 104-N (hereinafter collectively referred to as image sensor 104), a data repository 105, one or more first directional speakers 106, one or more second directional speakers 108 and input sources 109 communicatively coupled via a communication network 110. The communication network 110 may include, without limitation, a direct interconnection, local area network (LAN), wide area network (WAN), wireless network (e.g., using Wireless Application Protocol), the Internet, and the like.

The image sensor 104 may be for example, a camera fixed in each of one or more regions of the vehicle where one or more users generally sit. The image sensor 104 may be capable of capturing video feed 107 of user in each of the one or more regions in the vehicle in any file format such as, but not limiting to, Moving Picture Experts Group (MPEG), Flash Video (FLV), Audio Video Interleave (AVI), Windows Media Video (WMV) and other common file format for videos that can be converted to any suitable format before processing the videos. For example, the feed captured by the image sensors may be a video stream of user in each of the one or more regions in the vehicle. The video feed 107 captured by the image sensor 104 may be stored in the data repository 105 coupled with the PAGS 102.

The data repository 105 stores video feed 107 captured by at least one image sensor 104. The video feed 107 may comprise, for example, one or more images of users or passengers in each of the one or more regions in the vehicle. The data repository 105 may be integrated with PAGS 102, in one embodiment. In another embodiment, the data repository 105 may be configured as standalone device independent of PAGS 102.

The first directional speakers 106 may be for example, a directional speaker fixed in all the regions of the vehicle. The first directional speakers 106 may be capable of playing the sound or audio that the user intends to play, only in the certain position of the vehicle identified based on information related to user in the captured video feed 107. In one embodiment, the first directional speakers 106 may be mounted on the inner side of the roof of the vehicle so that sound emitted by the first directional speakers 106 is directed only towards the head of the user. In another example, first directional speakers 106 may be mounted on the headrest so that sound emitted by the first directional speakers 106 is directed only towards the ears of the user. The first directional speakers 106 may be integrated with PAGS 102.

The second directional speakers 108 may be for example, one or more directional speakers fixed in each of the one or more regions of the vehicle. The second directional speakers 108 may be capable of transmitting a second sound wave around an audio space boundary of identified position of the user, in corresponding region of the one or more regions. The second directional speakers 108 may be integrated with PAGS 102.

The system 100 also comprises one or more input sources 109 coupled with PAGS 102 via the communication network 110. The input sources 109 may be for example, media devices i.e. one of Universal Serial Bus (USB), Auxiliary Port (AUX), Compact Disk (CD), Frequency Modulation (FM) associated with one of the one or more regions in the vehicle, through which the user intends to play audio or music of his or her choice. For example, if the vehicle is a car, the media device USB may be associated with a region where driver is seated, and CD may be associated with a region beside the driver region, and FM and AUX may be associated with the rear seats of the car. In one embodiment, association of media device with each region may be pre-configured or dynamically configured based on user input. For example, the user seated in the driver seat can select the USB input source for rendering the audio using the first directional speakers in the region where the driver is seated, and the user seated in the rear of the vehicle can select the AUX port as the input source for rendering the audio using the first directional speakers in the region where the user in the rear of the vehicle is seated.

The PAGS 102 comprises at least a processor 120 and a memory 122 coupled with the processor 120. The processor 120 may be for example, a specialized processing unit, a typical graphics processing unit (GPU) or any other processing unit capable of processing the video feed 107 captured by at least one image sensor 104 associated with each of one or more regions in the vehicle. The PAGS 102 comprises an image analysis module 124, a boundary identification module 126, a sound wave generation module 128 and an audio space generation module 130. The image analysis module 124 is configured to receive video feed 107 captured by the image sensor 104 of each region in the vehicle. The image analysis module 124 may determine the user related information including position of the user, height of the user, and other information including material of the interior of the vehicle and acoustic characteristics associated with the determined material based on the video feed 207 captured by the image sensor 104. The image analysis module 124 is further configured to determine direction of one or more first directional speakers associated with each of the one or more regions in the vehicle based on the received user related information.

The boundary identification module 126 is configured to identify audio space boundary for each of one or more regions based on the direction of one or more first directional speakers 106 in corresponding region of the one or more regions. The sound wave generation module 128 is configured to determine the first sound wave associated with a user selected audio via input source 109 associated with each of the one or more regions in the vehicle. The sound wave generation module 128 is further configured to generate the second sound wave based on the first sound wave of the user selected audio. The audio space generation module 130 is configured to generate a personalized audio space in the vehicle by transmitting the second sound wave along the identified audio space boundary of the one of the one or more regions using one or more second directional speakers associated with the one of the one or more regions in the vehicle.

Figure 2:
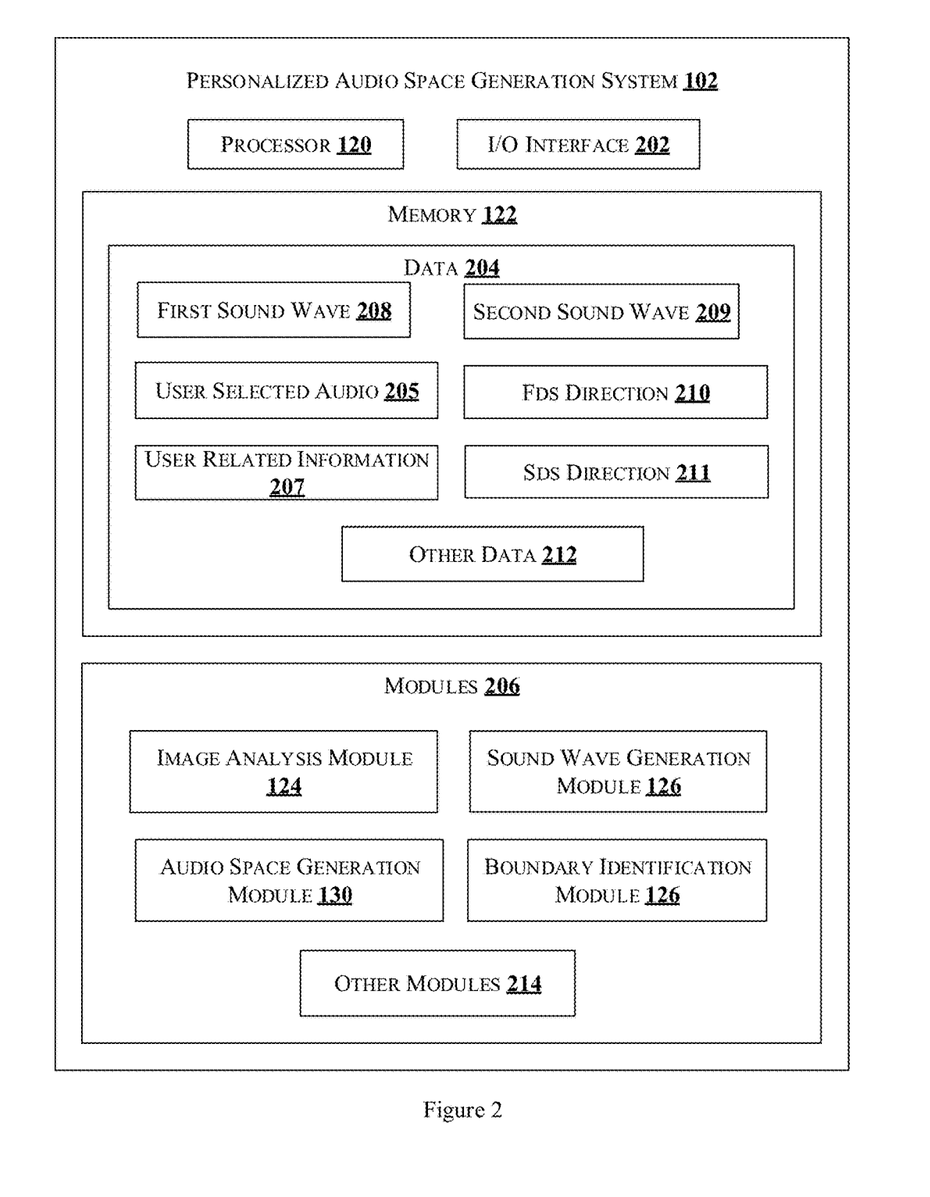
FIG. 2 shows a detailed block diagram illustrating a personalized audio space generation system of FIG. 1 in accordance with some embodiments of the present disclosure.

In an embodiment, PAGS 102 may be a typical PAGS 102 as illustrated in FIG. 2. The PAGS 102 comprises the processor 120, the memory 122 and an I/O interface 202 communicatively coupled with the processor 120. The PAGS 102 further includes data 204 and modules 206. In one implementation, the data 204 may be stored within the memory 122. In some embodiments, the data 204 may be stored within the memory 122 in the form of various data structures. Additionally, the data 204 may be organized using data models, such as relational or hierarchical data models. In one example, the data 204 may include user selected audio 205, user related information 207, a first sound signal or first sound wave 208, a second sound signal or second sound wave 209, a direction of first directional speaker (hereinafter referred as FDS direction 210), a direction of second directional speaker (hereinafter referred as SDS direction 211) and other data 212. The other data 212 may store displacement of the first sound wave, specific impedance for the first sound wave, and data including temporary data and temporary files, generated by the modules 206 for performing the various functions of the PAGS 102.

The modules 206 may include, for example, the image analysis module 124, the boundary identification module 126, the sound wave generation module 128 and the audio space generation module 130. The modules 206 may comprise other modules 214 to perform various miscellaneous functionalities of the PAGS 102. It will be appreciated that such aforementioned modules may be represented as a single module or a combination of different modules. The modules may be implemented in the form of software executed by a processor, hardware and/or firmware.

In operation, the image sensors 104 associated with each of one or more regions of the vehicle capture the video feed 107 of user in each of the one or more regions in the vehicle. The PAGS 102 receives the video feed 107 captured by image sensors 104 and analyzes the received video feed 107 to determine user related information 207. In an embodiment, the image analysis module 124 of PAGS 102 receives the video feed 107 captured by the image sensors 104 associated with each of the one or more regions of the vehicle. The image analysis module 124 determines the user related information 207 including height of the user, position of the user and information related to the position of the user in each of the one or more regions.

In one embodiment, the image analysis module 124 also determines material of interior of the vehicle and acoustic characteristics associated with the material of the interior of the vehicle from the received video feed 107. For each of the one or more regions or alternatively referred as each region, the boundary identification module 126 determines the direction 210 of one or more first directional speakers 106 associated with corresponding region of one or more regions based on the received user related information 207 including the acoustic characteristics of material of interior of the vehicle. The boundary identification module 126 further identifies the audio space boundary for each region based on the direction of first directional speakers i.e. FDS direction 210 of the corresponding region of the one or more regions. The direction of second directional speakers i.e. SDS direction 211 may be decided based on the direction of the first directional speakers 210. The sound wave generation module 128 renders the first sound wave 208 of the user selected audio 205 using the one or more first directional speakers 106 associated with one of the one or more regions where the user is seated. Subsequently, the sound wave generation module 128 determines the first sound wave 208 associated with the user selected audio 205 via input sources 109 that are associated with the each of the one or more regions. The user selected audio 205 is played via the one or more first directional speakers 106 associated with the one of the one or more regions. Upon determining the first sound wave 208, the sound wave generation module generates a second sound wave 209 based on the first sound wave 208 of the user selected audio 205, displacement of the first sound wave in the one of the one or more regions and specific acoustic impedance for the first sound wave 208 in the one of the one or more regions. The specific acoustic impedance of the first sound wave is considered, as the temperature controls/pressure in the vehicle may be different for different regions. The specific impedance may be the ratio of pressure to the particle velocity i.e. $r=\gamma p_0/c$. Based on air pressure in each region, r may vary. For example, the specific acoustic impedance may be determined as product of density and phase velocity of the first sound wave. Also, the second sound wave 209 is generated such that the amplitude and frequency of the second sound wave 209 is same as the amplitude and frequency of the first sound wave 208 and, 180 degrees out of phase with the first sound wave 208. In one example, if the first sound wave travelling towards positive x has a displacement of $\xi=A\ \exp[i(\omega t-kx)]$, the k may be changed to (+k) to indicate that the wave is travelling in opposite direction (negative x). The phase velocity of the first sound wave may be $c=\omega/k$, $\omega=2\pi f$ and $k=2\pi/\lambda$. The first sound wave can be represented using the above equation and the equation for the second sound wave may be created by changing the phase by 180 degrees. The overpressure and condensation of the first sound wave and the second sound wave are 180 degrees out of phase, and lead the displacement by 180° for a wave travelling in +x, but lag by 180 degrees for a wave in the negative or opposite direction −x. Thus, based on the specific impedance in each region and the displacement associated in each region for the first sound wave 208, the second sound wave 209 can be generated.

The audio space generation module 130 transmits the generated second sound wave 209 along the identified audio space boundary of the one of the one or more regions using one or more second directional speakers 108 associated with the one of the one or more regions. For example, the first sound wave 208 and the second sound wave 209 converge at the audio space boundary of the one of the one of more regions such that the second sound wave 209 restricts rendering of the first sound wave 208 beyond the audio space boundary of the corresponding region of the one or more regions to generate the personalized audio space in the vehicle.

Figure 3A:
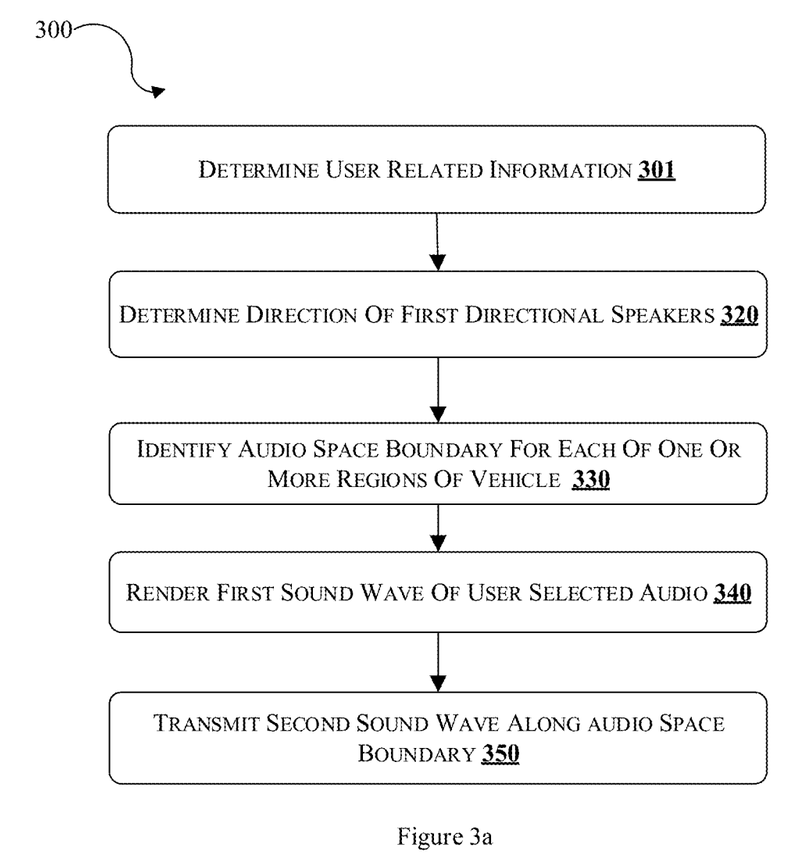
FIG. 3a shows a flowchart illustrating a method of generation of personalized audio space in vehicle in accordance with some embodiments of the present disclosure.

FIG. 3a shows a flowchart illustrating a method 300 of generating a personalized audio space in vehicle.

As illustrated in FIG. 3a, the method 300 includes one or more blocks illustrating a method of generating a personalized audio space using a personalized audio space generation system 102. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 3B:
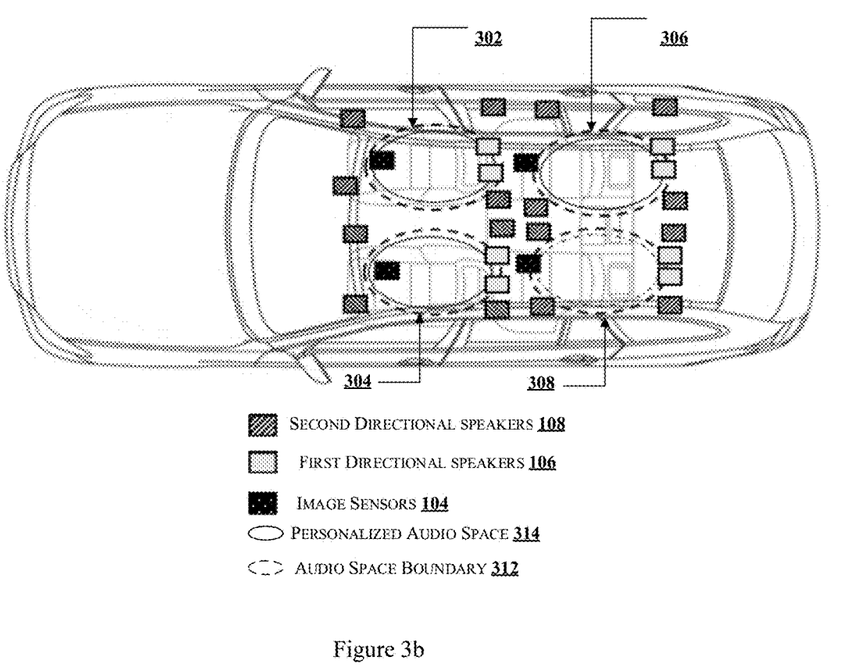
FIG. 3b illustrates identification of periphery around user in each region of the vehicle, and thereby creation of the personalised audio space in accordance with some embodiments of the present disclosure.

At block 301, the user related information 207 of user is determined. In an embodiment, the image analysis module 124 receives the video feed 107 captured by the image sensors 104 associated with each of one or more regions in the vehicle. For example, the image sensors 104 may be placed in each of one or more regions of the vehicle as illustrated in FIG. 3b. In one example, the video feed may be a collection of user or passenger images in each of one or more regions of the vehicle. In an embodiment, the captured images also include the interior of the vehicle. In an example, the one or more regions of the vehicle may be a region A 302, a region B 304, a region C 306, a region D 308, and the image sensors 104 may be arranged in each region as depicted in FIG. 3b. For each of the region A 302, the region B 304, the region C 306 and the region D 308, the image analysis module 124 determines the user related information 207 of the user in the region. For example, the user related information 207 may include height of the user, position of the user and information related to position of the user. The image analysis module 124 also determines the material of the interior of the vehicle captured in the video feed 107 and acoustic characteristics associated with the material of the interior of the vehicle. Based on the determined user related information 207, the direction of first directional speakers 106 is determined.

At block 320, direction of first directional speakers 106 is determined. In one embodiment, the boundary identification module 126 receives the user related information 207 including height of the user and position of the user, and the determined acoustic characteristics of the material of the interior of the vehicle. Upon receiving, the boundary identification module 126 determines the direction i.e. FDS direction 210 of first directional speakers 106 associated with the one of the one or more regions based on the received user related information 207. In one embodiment, the FDS direction 210 is varied based on the acoustic characteristics of the material of interior of the vehicle and the user related information 207 determined by the image analysis module 124. In one example, the direction may be defined as area in which the sound generated by the first directional speakers 106 would propagate. For example, the arrangement or placement of first directional speakers 106 may be as illustrated in FIG. 3b. The direction of first directional speakers 106 in region A 302 may be determined based on the user related information 207 including height of the user in region A 302, position of the user and the acoustic characteristics of the material of the interior of the vehicle in region A 302. The direction of the first directional speakers 106 in each of the region B 304, the region C 306 and the region D 308 is determined based on the user related information of the user in the corresponding region.

At block 330, audio space boundary 312 for each of one or more regions of vehicle is identified. In one embodiment, the boundary identification module 126 may identify the audio space boundary 312 of each region based on the determined FDS direction 210 of one or more first directional speakers 106 of corresponding region of the one or more regions. The boundary identification module 126 identifies the boundary or periphery along the area in which the sound generated by the first directional speakers 106 would propagate.

For example, if the FDS direction 210 of first directional speakers 106 propagates in an elliptical area as illustrated in FIG. 3b, then the audio space boundary 312 is identified just along the boundary or periphery of the elliptical propagated area. In FIG. 3b, dotted lined ellipse in each region indicate the audio space boundary 312 identified based on the FDS direction 210 of the first directional speakers 106 in the corresponding region of the one or more regions. The first directional speakers 106 in region A 302 may have the direction propagation in elliptical path, and hence the audio space boundary 312 may be identified along the boundary of the elliptical propagated area. The audio space boundary 312 in each of region B 304, region C 306 and region D 308 is identified in the direction propagated path of first directional speakers 106 in the corresponding region as depicted in FIG. 3b.

At block 340, the first sound wave of the user selected audio 205 is rendered. In an embodiment, the sound wave generation module 128 renders the user selected audio 205 using one or more first directional speakers 106 associated with one of the one or more regions. In one embodiment, the first sound wave 208 associated with the user selected audio 205 is determined based on a metadata of the user selected audio 205 stored in a media device connected to the one of one or more input sources 109 configured in the vehicle. For example, each region of the vehicle i.e. region A 302, region B 304, region C 306 and region D 308 in the FIG. 3b may be associated with input sources. The user seated in the region A 302 may select the USB input source for rendering the audio using the first directional speakers 106 of the region A 302, and the first sound wave 108 associated with the audio selected by the user in region A 302 may be determined based on metadata of the audio that is stored in the media device connected to USB. Further, the user seated in the region C 306 may select AUX port as the input source for rendering the audio using the first directional speakers 106 of the region C 306, and the first sound wave 108 associated with the audio selected by the user in region C 306 may be determined based on metadata of the audio that is stored in the media device connected to AUX port. The metadata of the audio is the information embedded in an audio file that is used to identify the content. Examples of the types of information that can be stored in an audio file's metadata area include title of the song, artist's name, album name that the song originates from, type of music/genre, album track number and the like. The determined first sound wave 208 of the user selected audio 205 is played using the first directional speakers 106 associated with the one of the one or more regions where the user is seated.

At block 350, the second sound wave is transmitted along the identified boundary space of one of the one or more regions. In an embodiment, the sound wave generation module 128 generates the second sound wave 209 associated with the first sound wave 208 of the user selected audio 205 based on the first sound wave 208, displacement of the first sound wave and specific acoustic impedance for the first sound wave 208 in the one of the one or more regions. In one embodiment, the second sound wave 209 associated with first sound wave 208 generated is of amplitude and frequency same as that of first sound wave 208. Also, the second sound wave 209 is of 180 degrees out of phase with the corresponding first sound wave 208. In one example, a first sound wave 208 travelling towards positive x has a displacement of $\xi = A\exp[i(\omega t - kx)]$. Wave number k may be changed to (+k) to indicate that the wave is travelling in opposite direction (negative x). The phase velocity of the first sound wave is $c = \omega/k$, $\omega = 2\pi f$ and $k = 2\pi/\lambda$. All the parameters in the first sound wave are algebraically related. The first sound wave 208 can be represented using the above equation and the equation may be created for the second sound wave 209 by changing the phase by 180 degrees. The overpressure and condensation of the first sound wave 208 and the corresponding second sound wave 209 are 180 degrees out of phase, and lead the displacement by 180° for a wave travelling in +x, but lag by 180 degrees for a wave in the negative or opposite direction −x, which makes the both sound waves cancel each other. Also, the specific acoustic impedance of the first sound wave 208 may be determined as product of density and phase velocity of the first sound wave 208 of the user selected audio 205. For example, specific acoustic impedance can be determined by the ratio of the pressure (potential) to the particle velocity (current) as a quantity $r = \gamma p_0/c$. Depending upon the air pressure in each of the one or more regions, the quantity r can vary. Based on the specific acoustic impedance in each region and the displacement associated in each region for the first sound wave 208, the second sound wave 209 may be generated.

For example, the first directional speaker in one of the regions i.e. region A 302 may have speaker cone of 5 cm and transmitting 50 W of acoustic power at 500 Hz. Consider temperature in the region A 302 as 18 degrees and pressure as 10 psi. Also, consider the second directional speaker in region C 306 with speaker cone of 5 cm and transmitting 50

W of acoustic power at 1000 Hz. Consider the temperature on the region C 306 as 24 degrees and the pressure as 20 psi. Thus, the displacement of the first sound wave in both the regions will be different.

At 500 Hz, wavelength is 16.65 cm, and wave number k is 0.0943 cm$^{-1}$, therefore the displacement amplitude is 0.025/0.0943 i.e. 0.29433 cm. The ratio is 0.00472. The sound pressure level (SPL) in dB is conventionally 20 log (p/2×10$^{-5}$ N/m$^2$), where p is the rms value of the overpressure (peak value divided by the square root of 2). The pressure of 10 psi corresponds to an intensity of 0.06894757293178 N/m$^2$. Thus, the specific impedance i.e. r for first region is 32.6 dyne-sec/cm$^3$.

At 1000 Hz, the wavelength is 33.3 cm, and the wave number k is 0.1887 cm$^{-1}$, therefore the displacement amplitude is 0.05/0.1887 i.e. 0.265 cm. The ratio $\xi/\lambda$, is 0.008. The sound pressure level (SPL) in dB is conventionally 20 log (p/2×10$^{-5}$ N/m$^2$). The pressure of 20 psi corresponds to an intensity of 0.1378951458636 N/m$^2$. Thus, r for second region is 40.6 dyne-sec/cm$^3$. Here, the value of r for the phase velocity of the second sound wave and for the first sound wave are directly proportional to each other. Thus, the second sound wave that is generated for each of the region A 302 and the region C 306 which to be transmitted around the determined audio space boundary is based on the specific acoustic impedance for each region and, which eliminates the first sound wave along the identified audio space boundary to create the personalized audio spaces for each of the one or more regions.

In an embodiment, the audio space generation module 130 creates the personalized audio space 314 in the vehicle such that the audio played by a user in one region is not heard by user of other regions. The audio space generation module 130 enables one or more second directional speakers 108 to transmit the generated second sound wave 209 along the audio space boundary 312 of corresponding region of one or more regions. For example, as illustrated in FIG. 3b the second sound wave 209 is transmitted along the identified elliptical path i.e. audio space boundary 312 using the second directional speakers 108. The second directional speakers 108 are arranged in each of the one or more regions as illustrated in FIG. 3b. The first sound wave 208 playing via the first directional speakers 106 are restricted to enter the other regions as the second sound wave 209 along the audio space boundary 312 of the region converge with the first sound wave 208 and gets cancelled at the identified audio space boundary of the region. Since the first sound wave 208 and the corresponding second sound wave 209 are 180 degrees out of phase, both the sound waves get cancelled at the audio space boundary 312 of the region. For example, considering region A 302 and region C 306 of FIG. 3b, the first sound wave of the audio playing through the first directional speakers of region A are cancelled at the dotted lined ellipse i.e. audio space boundary of that region and confined to play within the audio space boundary of the corresponding region of one or more regions by creating a personalized audio space 314 indicated by the solid lined ellipses as illustrated in FIG. 3b. Thus, audios playing in region A and region C are only heard by the user in the corresponding region. In an embodiment, the mechanism used to generate the personalized audio space for region A and region C is utilized to generate personalized audio space for region B and region D as shown in FIG. 3b. Thus, the personalized audio space is created in all of the regions i.e. region A, region B, region C and region D of the vehicle by restricting rendering of user selected audio 205 of one region beyond the audio space boundary 312 of the other region.

Figure 4:
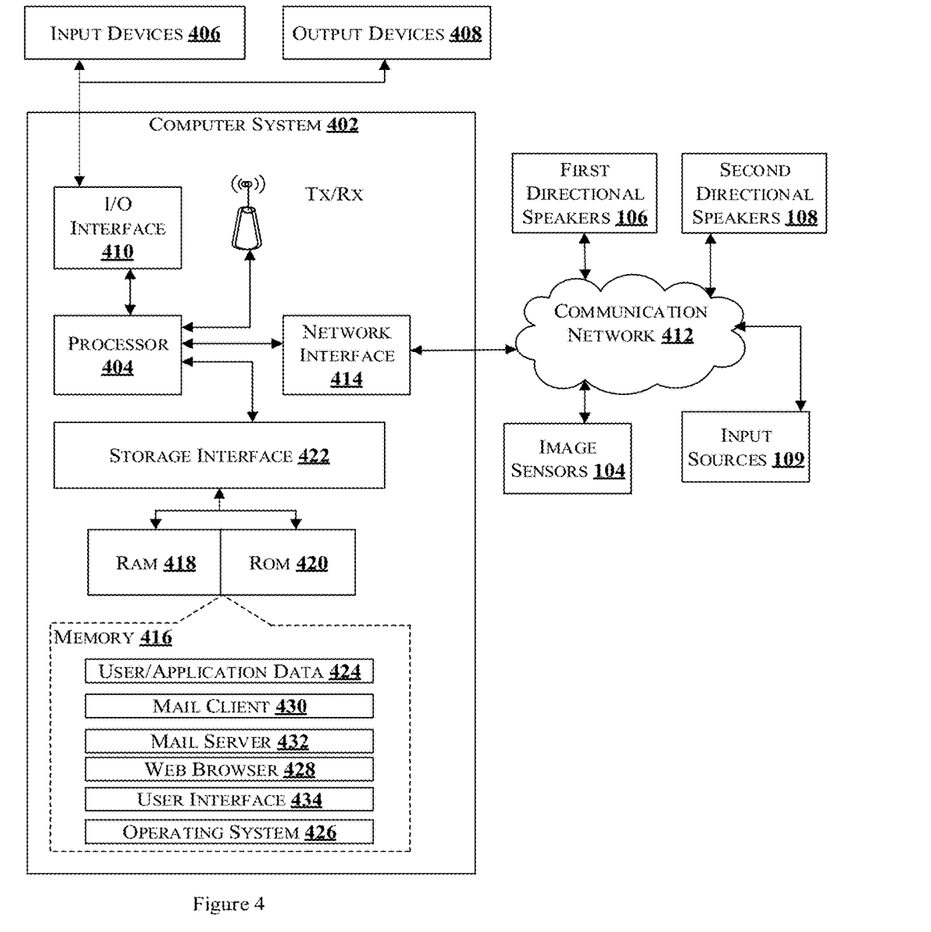
FIG. 4 illustrates a block diagram of an exemplary computer system for implementing embodiments consistent with the present disclosure.

FIG. 4 illustrates a block diagram of an exemplary computer system for implementing embodiments consistent with the present disclosure.

In an embodiment, the computer system 402 may be personalized audio space generation system 102, which is used for generating personalized audio space in the vehicle. The computer system 402 may include a central processing unit ("CPU" or "processor") 404. The processor 404 may comprise at least one data processor for executing program components for executing user or system-generated business processes. The processor 404 may include specialized processing units such as integrated system (bus) controllers, memory management control units, floating point units, graphics processing units, digital signal processing units, etc.

The processor 404 may be disposed in communication with one or more input/output (I/O) devices (406 and 408) via I/O interface 410. The I/O interface 410 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 410, the computer system 402 may communicate with one or more I/O devices (406 and 408). In some implementations, the processor 404 may be disposed in communication with a communication network 412 via a network interface 414. The network interface 414 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 414 and the communication network 412, the computer system 402 may be connected to the image sensors 104 for receiving one or more images or video stream captured by one or more image sensors 104-1, 104-2, . . . , 104-N, the first directional speakers 106, the second directional speakers 108 and the input sources 109.

The communication network 412 can be implemented as one of the several types of networks, such as intranet or any such wireless network interfaces. The communication network 412 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 412 may include a variety of network devices, including routers, bridges, servers, computing devices, storage devices, etc.

In some embodiments, the processor 404 may be disposed in communication with a memory 416 e.g., RAM 418, and ROM 420, etc. as shown in FIG. 4, via a storage interface 422. The storage interface 422 may connect to memory 416 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 416 may store a collection of program or database components, including, without limitation, user/application 424, an operating system 426, a web browser 428, a mail client 430, a mail server 432, a user interface 434, and the like. In some embodiments, computer system 402 may store user/application data 424, such as the data, variables, records, etc. as described in this invention. Such databases may be implemented as fault-tolerant, relational, scalable, secure databases such as Oracle or Sybase.

The operating system 426 may facilitate resource management and operation of the computer system 402. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2™, Microsoft Windows™ (XP™, Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Examples of Advantages of the Embodiment of the Present Disclosure are Illustrated Herein In an embodiment, the present disclosure identifies audio space boundary of each of one or more regions in the vehicle. The identification of audio space boundary using the FDS direction determined based on parameters such as height of the user in the region, position of the user, acoustic characteristics of the interior of the material of the vehicle, helps in accurate determination of boundary of space for audio content delivery.

In one embodiment, the present disclosure generates and transmits the second sound wave along the identified audio space boundary using the second directional speakers of the one of the one or more regions in the vehicle. As the second sound wave is with amplitude and frequency same as that of the first sound wave and 180 degrees out of phase with the first sound wave, the second sound wave converge with the first sound wave at the audio space boundary and restricts rendering of first sound wave beyond the identified audio space boundary. This provides a personalized music space for each region in the vehicle.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of generating a personalized audio space in a vehicle, the method comprising:

receiving, by a processor of a personalized audio space generation system, a user related information of a user in the vehicle from at least one image sensor associated with each of one or more regions in the vehicle;

determining, by the processor, direction of one or more first directional speakers associated with each of the one or more regions in the vehicle based on the received user related information;

identifying, by the processor, an audio space boundary for each of the one or more regions based on the direction of the one or more first directional speakers of corresponding region of the one or more regions;

rendering, by the processor, a first sound wave of a user selected audio in the determined direction using the one or more first directional speakers associated with one of the one or more regions where the user is seated; and transmitting, by the processor, a second sound wave corresponding to the first sound wave along the identified audio space boundary of the one of the one or more regions using one or more second directional speakers associated with the one of the one or more regions, wherein the first sound wave and the second sound wave converge at the audio space boundary of the region such that the second sound wave restricts rendering of the first sound wave beyond the audio space boundary of the one of the one or more regions to generate the personalized audio space in the vehicle.

2. The method as claimed in claim 1, wherein the user related information includes a height of the user, a position of the user, material of interior of the vehicle, and acoustic characteristics associated with the material in each of the one or more regions.

3. The method as claimed in claim 1, wherein transmitting the second sound wave corresponding to the first sound wave comprising:
   determining the first sound wave associated with the user selected audio via an input source associated with each of the one or more regions in the vehicle, wherein the user selected audio is played via the one or more first directional speakers associated with the one of the one or more regions; and
   generating the second sound wave based on the first sound wave of the user selected audio, displacement of the first sound wave in the one of the one or more regions and a specific acoustic impedance for the first sound wave in the one of the one or more regions.

4. The method as claimed in claim 3, wherein the specific acoustic impedance for the first sound wave is determined as product of density and phase velocity of the first sound wave of the user selected audio.

5. The method as claimed in claim 3, wherein the second sound wave comprises amplitude and frequency equivalent to that of the first sound wave.

6. The method as claimed in claim 3, wherein the second sound wave is 180 degrees out of phase with respect to the first sound wave.

7. The method as claimed in claim 1, wherein the first sound wave associated with the user selected audio is determined based on a metadata of the user selected audio stored in a media device connected to the one of one or more input sources configured in the vehicle.

8. The method as claimed in claim 1, wherein the determined direction of the first directional speaker is varied based on the user related information including acoustic characteristics of material of interior of the vehicle.

9. The method as claimed in claim 1, wherein direction of the second directional speaker is varied based on the audio space boundary in the one of the one or more regions.

10. A personalized audio space generation system, the system comprising:
   a processor;
   a memory, communicatively coupled with the processor, wherein the memory stores processor-executable instructions, which on execution cause the processor to:
      receive a user related information of a user in the vehicle from at least one image sensor associated with each of one or more regions in the vehicle;
      determine direction of one or more first directional speakers associated with each of the one or more regions in the vehicle based on the received user related information;
      identify an audio space boundary for each of the one or more regions based on the direction of the one or more first directional speakers of corresponding region of the one or more regions;
      render a first sound wave of a user selected audio in the determined direction using the one or more first directional speakers associated with one of the one or more regions where the user is seated; and
      transmit a second sound wave corresponding to the first sound wave along the identified audio space boundary of the one of the one or more regions using one or more second directional speakers associated with the one of the one or more regions, wherein the first sound wave and the second sound wave converge at the audio space boundary of the region such that the second sound wave restricts rendering of the first sound wave beyond the audio space boundary of the one of the one or more regions to generate the personalized audio space in the vehicle.

11. The system as claimed in claim 10, wherein the user related information includes a height of the user, a position of the user, material of interior of the vehicle and acoustic characteristics associated with material of the vehicle in each of the one or more regions.

12. The system as claimed in claim 10, wherein the processor is configured to transmit the second sound wave corresponding to the first sound wave by:
   determining the first sound wave associated with the user selected audio via an input source associated with each of the one or more regions in the vehicle, wherein the user selected audio is played via the one or more first directional speakers associated with the one of the one or more regions; and
   generating the second sound wave based on the first sound wave of the user selected audio, displacement of the first sound wave in the one of the one or more regions and a specific acoustic impedance for the first sound wave in the one of the one or more regions.

13. The system as claimed in claim 12, wherein the specific acoustic impedance for the first sound wave is determined as product of density and phase velocity of the first sound wave of the user selected audio.

14. The system as claimed in claim 12, wherein the second sound wave comprises amplitude and frequency equivalent to that of the first sound wave.

15. The system as claimed in claim 12, wherein the second sound wave is 180 degrees out of phase with respect to the first sound wave.

16. The system as claimed in claim 10, wherein the first sound wave associated with the user selected audio is determined based on a metadata of the user selected audio stored in a media device connected to the one of one or more input sources configured in the vehicle.

17. The system as claimed in claim 10, wherein the direction of the first directional speaker is varied based on the user related information including acoustic characteristics of material of interior of the vehicle.

18. The system as claimed in claim 10, wherein direction of the second directional speaker is varied based on the audio space boundary in the one of the one or more regions.

19. A non-transitory computer readable medium including instructions stored thereon that when processed by at least one processor cause a personalized audio space generation system to perform:
   receiving a user related information of a user in the vehicle from at least one image sensor associated with each of one or more regions in the vehicle;
   determining direction of one or more first directional speakers associated with each of the one or more regions in the vehicle based on the received user related information;
   identifying an audio space boundary for each of the one or more regions based on the direction of the one or more first directional speakers of corresponding region of the one or more regions;

rendering a first sound wave of a user selected audio in the determined direction using the one or more first directional speakers associated with one of the one or more regions where the user is seated; and transmitting a second sound wave corresponding to the first sound wave along the identified audio space boundary of the one of the one or more regions using one or more second directional speakers associated with the one of the one or more regions, wherein the first sound wave and the second sound wave converge at the audio space boundary of the region such that the second sound wave restricts rendering of the first sound wave beyond the audio space boundary of the one of the one or more regions to generate the personalized audio space in the vehicle.

20. The medium as claimed in claim 19, wherein the instructions stored thereon further causes the at least one processor to transmit the second sound wave corresponding to the first sound wave by:

determining the first sound wave associated with the user selected audio via an input source associated with each of the one or more regions in the vehicle, wherein the user selected audio is played via the one or more first directional speakers associated with the one of the one or more regions; and generating the second sound wave based on the first sound wave of the user selected audio, displacement of the first sound wave in the one of the one or more regions and a specific acoustic impedance for the first sound wave in the one of the one or more regions, wherein the second sound wave comprises amplitude and frequency equivalent to that of the first sound wave, further wherein the second sound wave is 180 degrees out of phase with respect to the first sound wave.

* * * * *